United States Patent [19]

Brown

[11] 4,267,523
[45] May 12, 1981

[54] INCIDENT RADIATION ABSORBER

[75] Inventor: Donald G. Brown, Newbury Park, Calif.

[73] Assignee: The United States of America as represented by the Secretary of the Air Force, Washington, D.C.

[21] Appl. No.: 1,334

[22] Filed: Jan. 5, 1979

[51] Int. Cl.³ .............................................. H01S 3/08
[52] U.S. Cl. ............................................... 331/94.5 C
[58] Field of Search ................... 331/94.5 C, 94.5 D; 350/293, 96.1, 294, 299; 126/438, 439, 451

[56] References Cited

U.S. PATENT DOCUMENTS

| | | | |
|---|---|---|---|
| 3,445,785 | 5/1969 | Koester et al. | 331/94.5 D |
| 3,538,453 | 11/1970 | Miller | 331/94.5 C |
| 3,699,471 | 10/1972 | Mulready et al. | 331/94.5 D |
| 4,077,391 | 1/1978 | Way | 126/451 |

OTHER PUBLICATIONS

"abc's of Infrared" by B. Bernard, Sams and Co., Bobbs-Merrill Co., pp. 7 and 24.

Primary Examiner—William L. Sikes
Assistant Examiner—Leon Scott, Jr.
Attorney, Agent, or Firm—Donald J. Singer; Jacob N. Erlich

[57] ABSTRACT

An incident radiation absorber having a plurality of cooled panels which provide for absorption steps for radiation reflected from the beam oscillation region of a laser. The panels are arranged in such an assembly array as to form a compact absorption system. Radiation absorbed is dissipated and reduced in intensity by the precisely set angles, surface coatings and cooling so as to render the radiation leaving the system as controlled, reduced to a harmless 2½% and directed away from the oscillation region of the laser.

9 Claims, 6 Drawing Figures

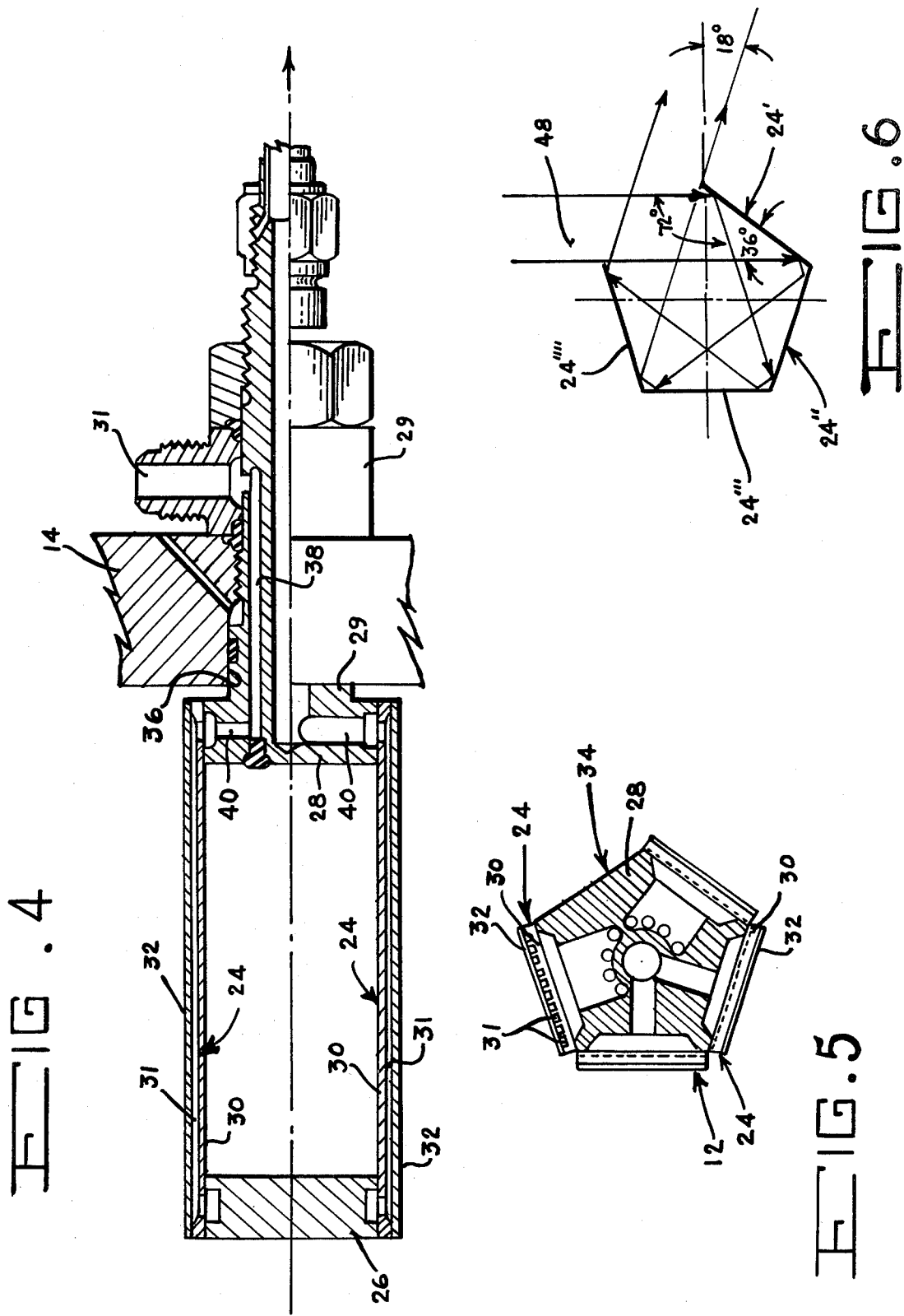

INCIDENT RADIATION ABSORBER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lasers, and, more particularly to an incident radiation absorber for use in conjunction with a laser.

The development of the laser has created a new area of technology which finds application in many systems already in existence today. For example, lasers can be found in the areas of optical communication, holography, medicine, cutting, calculating and radar. The utilization of the laser in such areas is in many instances dependent upon the amplification of the existing laser radiation.

In certain areas, such as in optical communications or optical radar, it is necessary to greatly amplify the initial radiation power produced by the laser. One laser which produces such high output power is the cylindrical chemical laser. In such a laser, or in most conventional lasers, the "optical or resonant cavity" of the laser typically comprises plane parallel or curved mirrors located a right angles to the axis of the cylindrical region. The cylindrical region may be in the form of a gas envelope or the like in which the lasing action takes place. For laser operation, one of the mirrors is required to be partially transmissive in order to extract a useful beam of coherent light from the "optical cavity".

Such high power lasers as described hereinabove frequently contain components such as supporting structures or struts which are exposed to incident radiation during laser operation. In addition, the radial feed passages located, for example, within the struts, and required to feed a high power chemical laser are exposed to very high heat loads from impingement of incident coherent radiation (up to 100 Btu/sec/in$^2$). This heat load will destroy any known material unless adequately protected. Furthermore, the reflected coherent radiation from such sources can cause parasitic losses so as to render the entire laser ineffectual.

Consequently, due to such high levels of irradiance, it is essential that the components of the laser described hereinabove be sufficiently protected for proper operation of the laser. Heretofore, devices incorporated within the laser in order to protect such components in many instances created additional sources of incident radiation and as a result failed to provide adequate protection during laser operation.

SUMMARY OF THE INVENTION

The instant invention overcomes the problems encountered in the past by providing an incident radiation absorber which is capable of being easily incorporated within an already existing laser.

In a typical conventional cylindrical chemical laser, supporting structures such as struts which in many instances carry radial feed passages therein, are attached at one end to the center body of the laser and at the other end to the surrounding laser support structure. The incident radiation absorber of this invention is positioned within the support structure of the laser surrounding the laser center body and is designed to absorb the incident radiation from, for example, the supporting struts. By the addition of the absorber of this invention within an already existing laser damage to the laser is substantially eliminated without introducing additional stray beams of radiation that would additionally cause parasitic losses within the laser. Furthermore, a reflective element may be utilized in conjunction with the absorber of this invention in order to provide better redistribution of the incident reflection.

The absorber of this invention is made up of easily fabricated, water-cooled panels which are mounted on an adjustable member in a plurality of locations within the support structure of the laser surrounding the center body. These absorbers accurately reflect and absorb the incident radiation through a series of these panels. Each panel is capable of absorbing approximately 80% of the incident radiation directed thereupon and in addition is capable of reflecting the remaining radiation. By a series of absorption and reflection by these panels substantially all the incident radiation is removed from the laser with only approximately 2½% of the remaining radiation being reflected from the last panel. This amount of radiation is usually considered harmless or can be dissipated into a heat sink if necessary.

In addition, the absorber of this invention can be rotated to any desired angle for alignment with the incident radiation while being fed by cooling fluid such as water. Since the absorber is also longitudinally adjustable, full positioning is possible with this invention.

It is therefore an object of this invention to provide an absorber which is capable of removing substantially all incident radiation directed thereupon.

It is another object of this invention to provide an incident radiation absorber which is fully adjustable so as to be readily acceptable within any laser.

It is still a further object of this invention to provide an incident radiation absorber which is cooled during operation.

It is still another object of this invention to provide an incident radiation absorber which is capable of operation in conjunction with a reflector.

It is still a further of this invention to provide an incident radiation absorber which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 4 is a side elevational view of the incident radiation absorber of this invention shown partly in cross-section;

FIG. 5 is a cross-sectional view of the incident radiation absorber of this invention taken along line V—V of FIG. 3; and FIG. 6 is a schematic representation of the incident radiation absorber of this invention showing the incident radiation impinging thereon.

DETAILED DESCRIPTION OF THE PREFERRED EMBODIMENT

Figure 1:
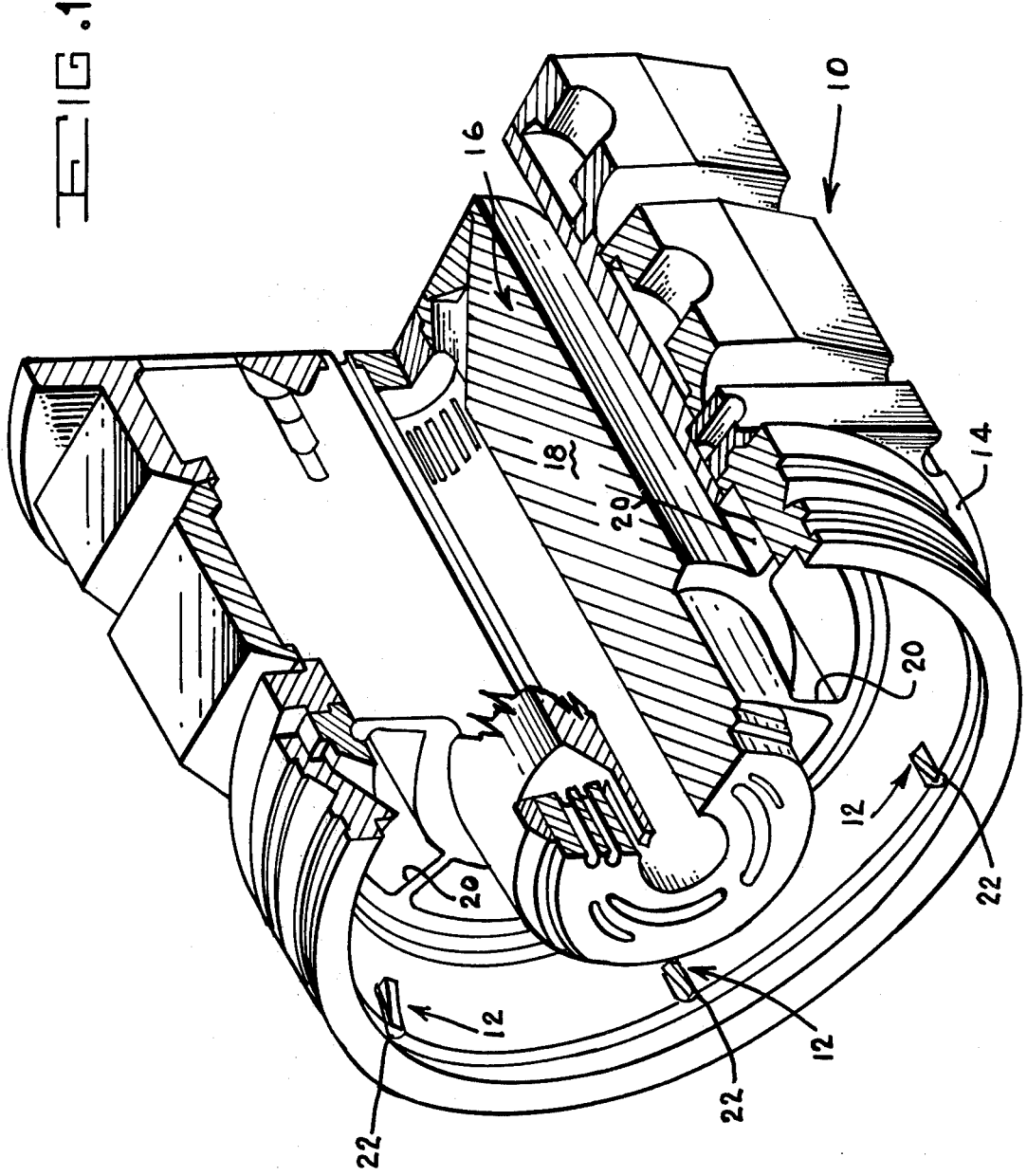
FIG. 1 is a pictorial representation of a typical cylindrical chemical laser showing the support structure of the laser including the areas within the support structure of the laser in which the incident radiation absorbers of this invention are positioned.

Reference is now made to FIG. 1 one of the drawing which shows in pictorial fashion a typical conventional cylindrical chemical laser 10 which incorporates therein a plurality of the incident radiation absorbers 12 of this invention. Cylindrical laser 10 is generally made up of an outer support structure 14 which fixedly secures in the center thereof a gain generator 16 formed of an elongated cylindrically-shaped injector center body manifold assembly 18. Center body manifold assembly 18 is supported by a plurality of radially extending struts 20 which are fixedly secured at one end thereof to the outer support structure 14 and at the other end thereof to center body manifold assembly 18. Struts 20 may contain therein the radial feed passages (not shown) required to feed the high powered chemical laser 10.

Since these struts 20 are located in a position to be exposed to the very high heat load and radiation from impingement of the incident coherent radiation during operation of laser 10, it is necessary to properly protect them. This is accomplished by the utilization of a plurality of the incident radiation absorbers 12 of this invention situated within the outer support structure 14 of laser 10.

Figure 2:
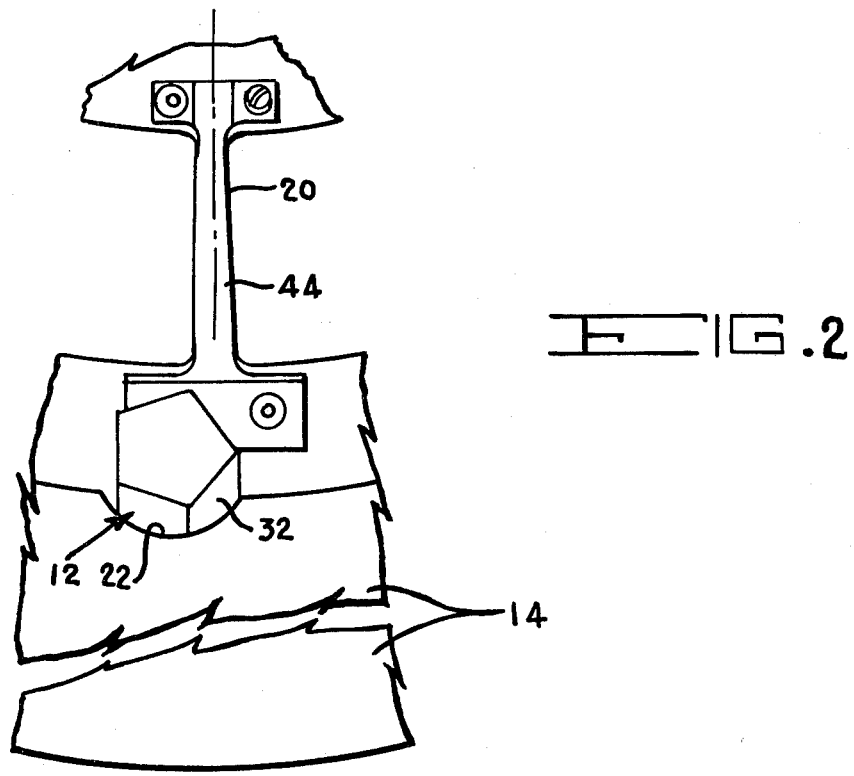
FIG. 2 is a front view showing the position of the incident radiation absorber of this invention within the support structure of the laser.
Figure 3:
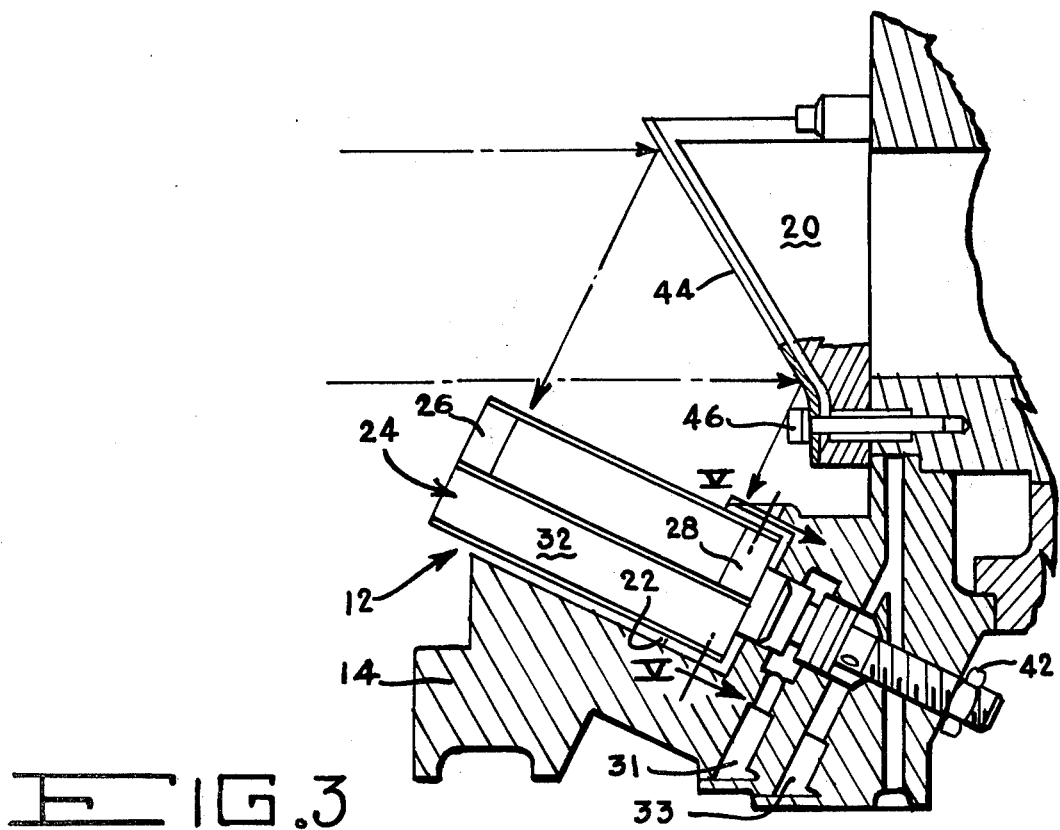
FIG. 3 is a side elevational view of the incident radiation absorber of this invention shown in position within the support structure of the laser as well as the position of a reflector connected to the strut of the laser and shown partly in cross-section.

Reference is now made to FIGS. 2 through 4 of the drawing which clearly show the position and construction of incident radiation absorber 12 of the instant invention. Although a plurality of absorbers 12 are utilized within a laser, the following description will be made with reference to only one such absorber 12 since the construction of all absorbers 12 are identical. Each of the absorbers 12 is situated within a respective indentation 22 located within the outer support structure 14 of laser 10. Each indentation 22 is designed to support absorber 12 at an inclined position and adjacent to each of the supporting struts 20 of laser 10. In this manner any incident radiation reflected from struts 20 can be received directly by absorber 12.

Reference is now made to FIGS. 3 through 5 of the drawing which clearly show the mounting arrangement as well as the construction of absorber 12 of this invention. As clearly illustrated in these figures, each absorber 12 is made up of a plurality of longitudinally extending panels 24, preferably four in number, being supported at each end thereof by an end plate 26 and 28, respectively. Each panel 24 is made up of an inner plate 30 and an outer plate 32. A plurality of longitudinal extending cooling channels 31 are formed within in each inner plate 30, with outer plate 32 forming a closure for channels 31 and forming the outer surface of each absorber 12. It is preferrable that inner plate 30 be made of any suitable absorbing material such as copper which may be chemically treated so as to form a copper oxide surface thereon. As a result approximately 80% of the incident radiation impinged thereon will be absorbed by each panel 24 of absorber 12.

Although not limited to the number of panels 24, shown in the drawing, four such panels 24 are secured together as shown in FIG. 5 of the drawing by any suitable means, such as brazing, so as to form an angular-wall configuration having one open side 34. This open side 34 forms the entrance for the incident radiation which reflects from supporting strut 20 of laser 10. A more detailed discussion of the angular relationship of the impinging radiant beam of energy will be set forth in detail hereinbelow with respect to FIG. 6 of the drawing.

Referring now to FIGS. 4 and 5 of the drawing it is clearly shown that end plate 28 of absorber 12 has an elongated bolt-like member 29 attached to or formed as part of one end thereof so as to protrude through an opening 36 located within the supporting structure 14 of laser 10. This bolt-like member 29 has a pair of channels 38 (only one of which is shown in the FIG. 4 of the drawing) located therein. Channels 38 are directly connected by way of conduits 40 to the plurality of cooling channels 30 within the panels 24 of absorber 12 as well as to any suitable fluid source (not shown), by means of conduits 31 and 33. Secured to the end of each member 29 is a nut 42 which allows for the adjustable and rotatable movement of member 29 of absorber 12 with respect to the supporting structure 14 of laser 10.

In addition, as shown in FIGS. 2 and 3 of the drawing, if desired, an additional reflecting element 44 may be secured to each supporting strut 20 by way of bolt 46 so as to more directly reflect the incoming incident radiation into the open side 34 of absorber 12. The incident radiation is indicated by the arrows in FIG. 3 of the drawing and in more detail by the arrows in FIG. 6 of the drawing.

As shown schematically in FIG. 6 of the drawing, the incoming radiation 48 impinges upon and is initially absorbed by one of the panels 24', this absorption being approximately 80%. As a result of the angular relationship between the incoming radiation 48 and panels 24, (that is, 36° with the coming beams and 72° between the reflected beam and the incoming beam) incident beam radiation removal occurs. Approximately 20% of incident radiation is reflected from panel 24' to panel 24" wherein another 80% of the remaining incident radiation is also absorbed. This continuous reflection and absorption takes place with the remaining panels 24''' and 24'''' so that the absorbed radiation is dissipated and reduced in intensity to a harmless 2½% of the initial incident radiation. The remaining 2½% radiation is considered harmless and is directed away from the oscillation region of laser 10, thus allowing maximum laser action.

Each panel 24 is fed and cooled with approximately 1 gallon/minute coolant fluid such as water through chanels 31 while the radiation absorption takes place by absorber 12 of this invention. The remaining 2½% radiation in the last reflection is usually considered harmless or can be dissipated by any conventional heat sink (not shown). In addition absorber 12 can be rotated to any desired angle for alignment with struts 20 while continually being cooled with any suitable liquid such as water. Since absorber 12 can also be adjusted in the longitudinal direction, full positioning is possible.

Although this invention has been described with reference to a particular embodiment, it will be understood that this invention is also capable of further and other embodiments within the spirit and scope of the appended claims.

I claim:

1. An incident radiation absorber comprising a body having a plurality of sides, one of said sides being open to allow incident radiation to enter, the remaining sides being in the form of longitudinally extending panels, said panels being secured to each other at a predetermined angular relationship, said panels being made of a material capable of absorbing a substantial portion of said incident radiation and reflecting the remaining portion of said incident radiation to an adjacent panel and means connected to said body for adjusting the position of said body with respect to said incident radiation whereby substantially all of said incident radiation is absorbed by said absorber, at least one of said panels comprising an inner and an outer longitudinal extending plate, means located within one of said plates for allowing the passage of a cooling fluid therethrough and means located within said adjusting means connected to said fluid passage means for allowing said fluid to enter and exit from said fluid passage means.

2. An incident radiation absorber as defined in claim 1 wherein said inner plate is made of a material which has substantially greater absorption characteristics than reflection characteristics.

3. An incident radiation absorber as defined in claim 2 wherein said panels are secured in said predetermined angular relationship by a pair of end plates, one of said end plates having means therein for connecting said fluid entrance and exit means to said fluid passage means.

4. In a laser having a gain generator, a surrounding outer support structure and at least one strut for supporting said gain generator within said outer support structure, the improvement therein being in the form of an incident radiation absorber located within said outer support structure adjacent said supporting strut, said incident radiation absorber comprising a body having a plurality of sides, said side directly adjacent said strut being open to allow incident radiation reflected from said strut to pass into said body, the remaining sides being secured to each other at a predetermined angular relationship, said panels being made of a material capable of absorbing a substantial portion of said incident radiation and reflecting the remaining portion of said incident radiation to an adjacent panel and means connected to said body for adjustably securing said body in said outer support structure whereby substantially all of said incident radiation reflected from said strut is removed from said laser.

5. In a laser as defined in claim 4 further comprising means connected to said supporting structure for reflecting said incident radiation into said open side of said body.

6. In a laser as defined in claim 5 wherein at least one of said panels comprises an inner and an outer longitudinal extending plate, means located within one of said plates for allowing the passage of a cooling fluid therethrough and means located within said ajusting means connected to said fluid passage means for allowing said fluid to enter and exit from said fluid passage means.

7. In a laser as defined in claim 7 wherein said inner plate is made of a material which has substantially greater absorption characteristics than reflection characteristics.

8. In a laser as defined in claim 7 wherein said panels are secured in said predetermined angular relationship by a pair of end plates, one of said end plates having means therein for connecting said fluid entrance and exit means to said fluid passage means.

9. In a laser as defined in claim 8 wherein said adjustable securing means is the form of a member formed as part of one of said end plates.

* * * * *